B. L. CORNELIUS.
OIL BURNER.
APPLICATION FILED JAN. 13, 1913.
1,120,791.
Patented Dec. 15, 1914.
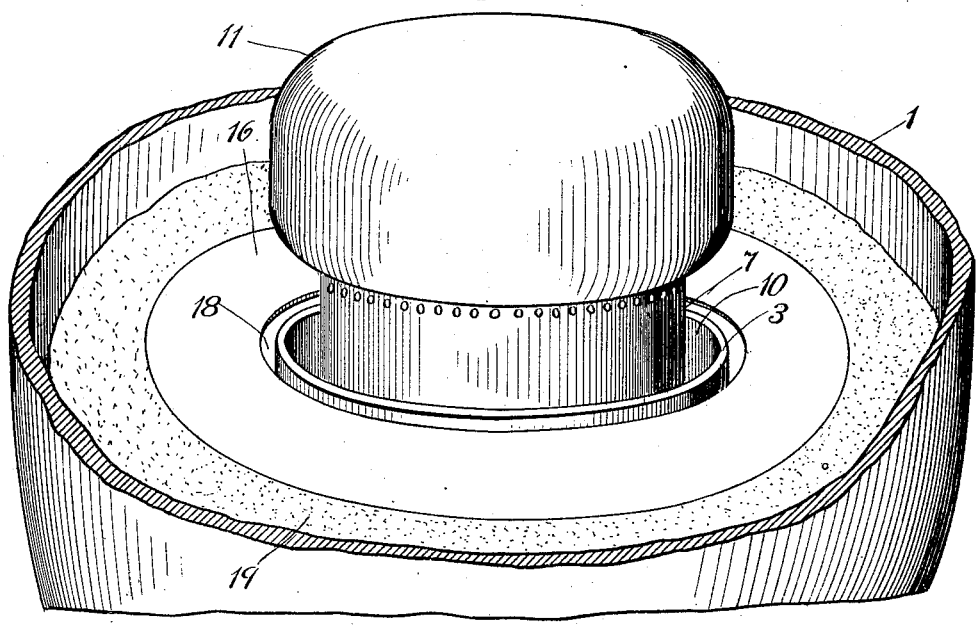
Fig. I.
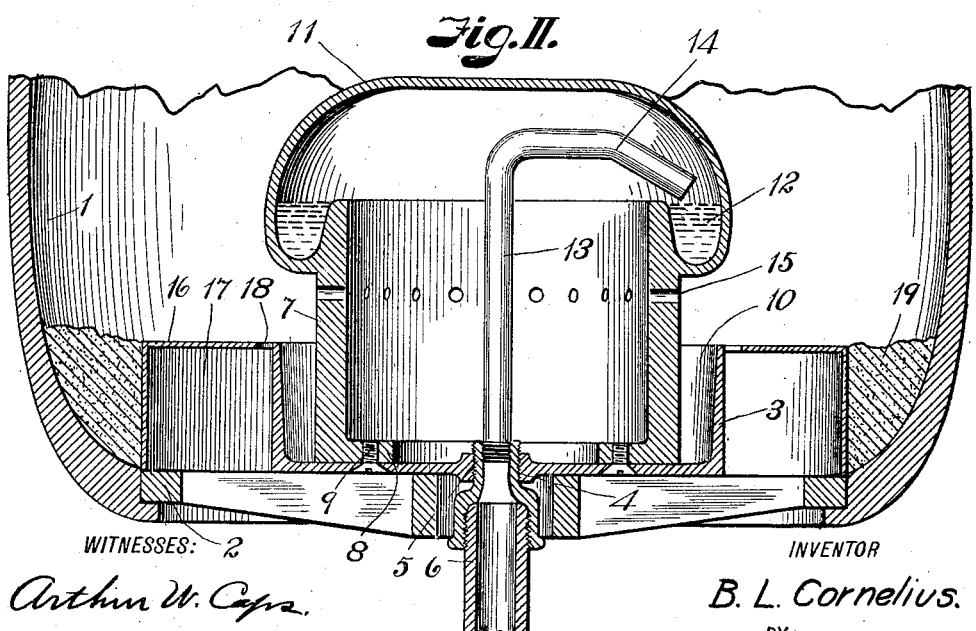
Fig. II.
WITNESSES:
Arthur W. Capp.
Lewis L. Miller.
INVENTOR
B. L. Cornelius.
BY
Arthur C. Crown
ATTORNEY

UNITED STATES PATENT OFFICE.

BENJAMIN L. CORNELIUS, OF HUTCHINSON, KANSAS.

OIL-BURNER.

1,120,791.  Specification of Letters Patent.  Patented Dec. 15, 1914.

Application filed January 13, 1913. Serial No. 741,788.

*To all whom it may concern:*

Be it known that I, BENJAMIN L. CORNELIUS, a citizen of the United States, residing at Hutchinson, in the county of Reno and State of Kansas, have invented certain new and useful Improvements in Oil-Burners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to oil burners, and more particularly to a burner adapted for use in heating stoves or hot air furnaces, the principal object of the invention being to provide a device wherein oil may be vaporized and mixed with air to secure proper combustion.

In accomplishing this object I have provided the improved details of structure hereinafter described and illustrated in the accompanying drawings, wherein:—

Figure I is a perspective view of an oil burner constructed according to my invention, showing its combination with the fire bowl of a stove or furnace, the latter being in section, for better illustration. Fig. II is a central, vertical section of the parts shown in Fig. I.

Referring more in detail to the parts; 1 designates the fire bowl of a stove or furnace and 2 the grate, which may be of the usual construction.

Supported on the grate 2 is a pan 3, preferably of cast metal, and having a central aperture 4 through which the nipple 5 of an oil supply pipe 6 is projected.

Seated in the pan 3 is a burner body 7, which is also preferably of cast metal, of cylindrical shape and provided with an inturned flange 8 by which it is secured to the pan by screws 9, or the like, the body 7 being set in from the sides of the pan 3 to provide an annular space 10, for a purpose presently set forth.

On top of, and preferably integral with, the body 7 is a dome 11 which covers the top of the burner body and depends at the sides thereof to form an annular, upwardly opening channel 12 for receiving oil from the feed conduit 13 which connects with the supply nipple 5 and has a laterally turned upper end 14 adapted for dropping oil into the annular channel.

Opening through the body of the burner immediately below the channel 12, and above the top of the pan 3, are apertures 15 through which oil delivered into the interior of the burner by overflow from the channel may pass to flow down the outer surface of the burner body into the annular space between the burner body and the sides of the pan.

Also seated on the grate 2 is an annular hood 16 forming an air chamber 17 around the pan 3 and above the grate, the upper portion of said hood being substantially level with but spaced from the top of the pan 3 to form an annular port 18 through which air passing upwardly through the grate of the fire bowl and through the chamber 17 may pass to mix with the oil vapor and thereby provide a combustible fuel mixture.

In order to seal the burner hood and thereby prevent air from entering the fire bowl except through the annular port 18 I fill the lower portion of the fire bowl, around the hood, with a packing of asbestos cement 19.

In using the device, presuming the parts to be assembled as described, oil is allowed to flow through the conduit 13 and drop into the dome channel 12, overflowing the inner edge of the channel and filling the interior of the burner body until it reaches the level of the apertures 15, through which it passes to flow down the outer surface of the burner body into the pan 3. The oil is then ignited in the pan and while burning heats the burner body and dome so that oil in the dome channel and interior of the burner body is vaporized and, by expansion, is forced out through the apertures 15 to the outside of the burner. The vapor upon leaving the burner body mixes with air rising through the annular port 18 to form the combustible mixture which is burned within the furnace.

It is apparent that the burning oil continues to heat the dome and the upper portion of the burner body so that vaporization of the oil continues as long as the feed is maintained and the vapor burned.

Having thus described my invention, what I claim as new therein and desire to secure by Letters-Patent, is:

Claims:

1. An oil burner comprising a body member, an imperforate dome coöperating therewith to form an annular oil reservoir, a conduit extending through the body member and having a laterally turned upper end adapted for delivering oil into the reservoir, the body member of the burner having transverse apertures located below the reservoir, and a cup surrounding the lower end of said body member for the purpose set forth.

2. An oil burner comprising a body member, an imperforate dome integral therewith and depending over the upper edge thereof to form a reservoir, and a supply conduit extending through the body member and having a laterally turned end adapted for delivering into the reservoir, said body member being provided with transverse apertures below the reservoir, forming ports for the escape of vapor generated within the reservoir for the purpose set forth.

3. In an oil burner, the combination with a fire bowl, of a pan seated in the fire bowl, and set in from the sides thereof, a body member having outlet ports above the pan, and having an integral dome thereon extending downwardly at the sides of the body and forming an annular reservoir, a conduit leading through the body member, and adapted for delivering into said reservoir, and a hood member seated in the fire bowl about the pan, and having a port adjacent the pan adapted for delivering air into proximity to said outlet ports, for the purpose set forth.

4. In an oil burner, the combination with a fire bowl, of a pan seated in the fire bowl, and set in from the sides thereof, a body member seated in the pan and set in from the sides thereof to form an annular channel, and having outlet ports above the upper edge of the pan, an imperforate dome integral with said body member and extending downwardly at the sides of the body to form an annular reservoir, a conduit leading through the body for delivery into said reservoir, and a hood member seated in the fire bowl and spaced from the pan to form a port for delivering air into proximity to said outlet ports, for the purpose set forth.

5. In an oil burner, the combination with a fire bowl, of a pan seated in the fire bowl and set in from the sides thereof, a hollow body member secured to the base of said pan and set in from the sides thereof, and having outlet ports above the base of said body member and above the upper edge of said pan, an imperforate dome integral with and forming a closed chamber within said hollow body member, and extending downwardly at the sides thereof to form an annular reservoir, a conduit leading through said body and closed chamber for delivering into said reservoir, and a hood member seated in the fire bowl and spaced from the pan to form a port for delivering air into proximity to said outlet ports, for the purpose set forth.

In testimony whereof I affix my signature in presence of two witnesses.

BENJAMIN L. CORNELIUS.

Witnesses:
E. S. HANDY,
IRA A. DARRIES.

Copies of this patent may be obtained for five cents each, by addressing the "Commissioner of Patents, Washington, D. C."